US008751067B2

(12) United States Patent
Pham

(10) Patent No.: US 8,751,067 B2
(45) Date of Patent: Jun. 10, 2014

(54) ELECTRONIC FLIGHT BAG SYSTEM AND METHOD

(75) Inventor: Tuan A. Pham, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1423 days.

(21) Appl. No.: 11/679,486

(22) Filed: Feb. 27, 2007

(65) Prior Publication Data
US 2008/0208399 A1    Aug. 28, 2008

(51) Int. Cl.
*G01C 23/00*    (2006.01)
*G06F 3/14*    (2006.01)
*G06F 3/147*    (2006.01)
*G06F 13/00*    (2006.01)

(52) U.S. Cl.
USPC .............................................................. 701/3

(58) Field of Classification Search
USPC ........ 244/129.3; 345/592; 455/431; 701/3, 4; 717/173
See application file for complete search history.

(56) References Cited

U.S. PATENT DOCUMENTS

| | | | |
|---|---|---|---|
| 6,977,666 B1 * | 12/2005 | Hedrick | 345/690 |
| 2004/0046712 A1 * | 3/2004 | Naimer et al. | 345/9 |
| 2004/0254691 A1 * | 12/2004 | Subelet | 701/3 |
| 2005/0200502 A1 * | 9/2005 | Reusser et al. | 340/973 |
| 2006/0041340 A1 * | 2/2006 | Stefani | 701/4 |
| 2007/0038939 A1 * | 2/2007 | Challen et al. | 715/734 |
| 2007/0219676 A1 | 9/2007 | Allen et al. | |
| 2007/0240676 A1 * | 10/2007 | Sasaki | 123/337 |

OTHER PUBLICATIONS

Allen, D. "Electronic Flight Bag." Boeing Aero Magazine, No. 23, Jul. 2003, pp. 16-27.*
Allen, David. "Electronic Flight Bag," Boeing Aeromagazine, Oct. 10, 2006, XP002496643, Retrieved from the Internet: URL:http://web.archive.org/web/20061010202846/http://www.boeing.com/commercial/aeromagazine/aero_23/EFB_story.html [retrieved on Sep. 22, 2008] 7 Pages.

* cited by examiner

*Primary Examiner* — Khoi Tran
*Assistant Examiner* — Dale Moyer
(74) *Attorney, Agent, or Firm* — Harness, Dickey & Pierce, P.L.C.

(57) ABSTRACT

An electronic flight bag (EFB) system for use on a mobile platform, for example, a commercial or military aircraft. The EFB system includes first and second independent processors that run first and second independent software applications. The first software application may be a Type C application requiring a high level of governmental agency certification for use on an aircraft while the second application may be a commercially available, off-the-shelf software application that requires no certification. The two processors share a common display, although the first processor is provided with control over the display so that use of the display by the second processor can be inhibited or limited by the first processor as may be needed to display more critical flight or aircraft related information. The first processor is also provided with control over a switching subsystem that can interrupt the flow of information from external I/O devices to and from the second processor, if needed.

19 Claims, 2 Drawing Sheets

ELECTRONIC FLIGHT BAG SYSTEM AND METHOD

FIELD

The present disclosure relates to systems and methods for operating a pair of processors simultaneously to run a pair of application programs, and where one of the processors is able to control the display of information on a display that the two processors are sharing such that information from one of the processors may take priority over information from the other, and information can be displayed on a single display in accordance with a predetermined priority.

BACKGROUND

A Class III Electronic Flight Bag (EFB) device is a relatively new integrated hardware, software, and service solution that enables digital information delivery and management to an aircraft flight deck. The Class III EFB provides an integrated solution for managing important information while the aircraft is in flight or at an airport or airfield. In the United States, Class III EFB devices are regulated by the Federal Aviation Administration (FAA) in accordance with Advisor Circular (AC) 120-76A.

In general, there are three classes of hardware devices and three types of software applications as summarized below:

Hardware Classes:
Class 1—Considered as Portable Electronic Device (PED)
allows connectivity to aircraft for power;
Allows wireless data connectivity;
Class 2—Considered a PED but dockable into a mount on the aircraft during flight
allowed to be connected to a mounting device on an aircraft for power and data connectivity during normal operation;
requires Aircraft Evaluation Group (AEG) and certification, from Aircraft Certification Service (AIR);
is required to go through an administrative control to use in an aircraft.
Class 3—Certified Cockpit Display
considered as installed avionics equipment that requires AIR approval
follows avionics certification standards set forth by the FAA;
certification level depends upon safety hazard analysis.
Software Classes:
Type A: precomposed; fixed presentations; paper format
requires Principal Inspector (PI) approval;
requires Flight Standards District Office operational approval;
requires six-month evaluation period.
Type B—Dynamic, interactive applications
requires PI approval plus Aircraft Evaluation Group (AEG) approval;
requires flight standards operational approval;
requires six-month evaluation period before approval;
requires keeping the aircraft centered on map (but no aircraft symbol);
panning, zooming and other active manipulation allowed; must be available during all flight phases.
Own-ship Position (i.e. Type C)
AC 120-76A, by itself, may not be used to install own-ship position on a moving map. However, as new guidance is developed, may be used in combination with AC 120-76A to add additional applications.

There are several technical challenges with designing a class III EFB device, that can run all types of software (i.e. Type B, and C with own-ship position). A class III device, which will simultaneously run both Type B software and Type C software sharing the same display screen and keyboard I/O device, is constrained by the following design issues:

FAA Certified Screen Display De-Confliction:

When a lower priority task (typically Type B software) is running in the foreground and has full control of the display screen, and a higher priority task (typically Type C software) is running in the background, the occasion may arise where the higher priority task needs to gain control of the display and the data I/O. For example, if the higher priority task needs to gain control of the display and data entry I/O to provide an urgent message to the pilot, FAA requirements state that the higher priority software must be certified to confirm that it will be able to forcefully gain control of the display hardware and data entry I/O from the lower priority task. Failure to do so may prevent the high priority task from providing urgent warnings to the operator—which would be a safety violation. Presently, to resolve this issue requires an FAA certified approach for interaction between the higher priority task software and the lower priority task software.

Data Separation:

Because of the interaction between different types of software, there will often be certain sharing of common data between the higher priority software application and the lower priority software application. For example, a Type C application could be running a classified task and a Type B application could be concurrently running an unclassified task. Having these applications interacting with each other could give rise to the need for the same security certification for the Type B application. In, other words, the Type B application would need to be able to "de-prioritize" itself to allow the Type C application to take priority over the display and data I/O operations. However, this type of self-prioritizing feature is often not possible to implement with a Type B application since most such applications are commercial "off-the-shelf" (COTS) applications, and the source code for most COTS applications is typically not available to submit for an FAA certification process.

Independent Software Development:

To allow the different applications to run concurrently while sharing the same display and data entry I/O, there must exist an interface control that facilitates the needed display and data I/O sharing that meets FAA requirements for Type B and C applications. However, such a level of interoperability between two otherwise independent software applications, one typically being a COTS software application, is presently not readily available. In practice, it is generally not possible to find independent software applications developed by different entities that are able to run concurrently with the needed level or display and I/O sharing, while implementing the needed level of priority of one application over the other. This issue prevents users from procuring cost effective COTS software (e.g. MS WINDOWS®) to be used on the EFB for managing less critical tasks, while at the same time running a separate, FAA certified software program that manages more flight critical tasks.

SUMMARY

The present disclosure is directed to a system and method for managing and prioritizing two applications, in one example two software applications, that are running concurrently on an electronic information system and sharing a common display device and common data I/O bus or port. In one example the electronic information system forms a combined Class II and Class III Electronic Flight Bag (EFB) system for use in commercial and military aircraft.

In one implementation the system makes use of a first processor running a first application that generates a first quantity of information that is displayed on a display. A second processor runs a second application that generates a second quantity of information that is also displayed on the display. One or the other of the applications, for example the first application, may comprise a more mission or flight critical application, while the other involves a less mission or flight critical application. The first processor, however, controls the display as needed, in accordance with operation of the first application, to modify the display if needed based on the operation of the first (more critical) application.

In one specific implementation, the system forms a combined Class II and Class III EFB for use on military and/or commercial aircraft. The EFB has a first processor that runs an FAA certified Type C application, and a second processor that simultaneously runs a lower priority Type B application. Both processors share a common display and a common input/output (I/O) port or bus for communications purposes with external I/O devices (e.g., keyboard, mouse, light tablet, etc).

The first processor controls the display such that the display can be used to display information generated or otherwise transmitted from the second processor when use of the display is not needed by the first processor to display more critical information. However, when the first processor determines the need to display information generated by the Type C application on the display (i.e., information that is more critical than that being generated by the Type B application), then the first processor takes over control of the display as needed to present the more critical information on the display. Control over the display by the first processor may involve completely blocking signals from the second processor to the display. Alternatively, the control over the display may involve projecting information from the Type C application over a portion of the information being displayed from the Type B application, or even merging information being generated by both applications into a single (i.e., "composite") display.

In another implementation the first processor is able to control operation of a switch that is interposed between an I/O data bus and the second processor. The first processor can control the switch to completely interrupt the flow of information to the second processor if needed.

The system and method provides the significant advantage that since the first application and first processor are provided with complete control over the display and I/O operations of the second application, a less demanding, and potentially less costly and time consuming, level of governmental agency certification is required for the second application.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
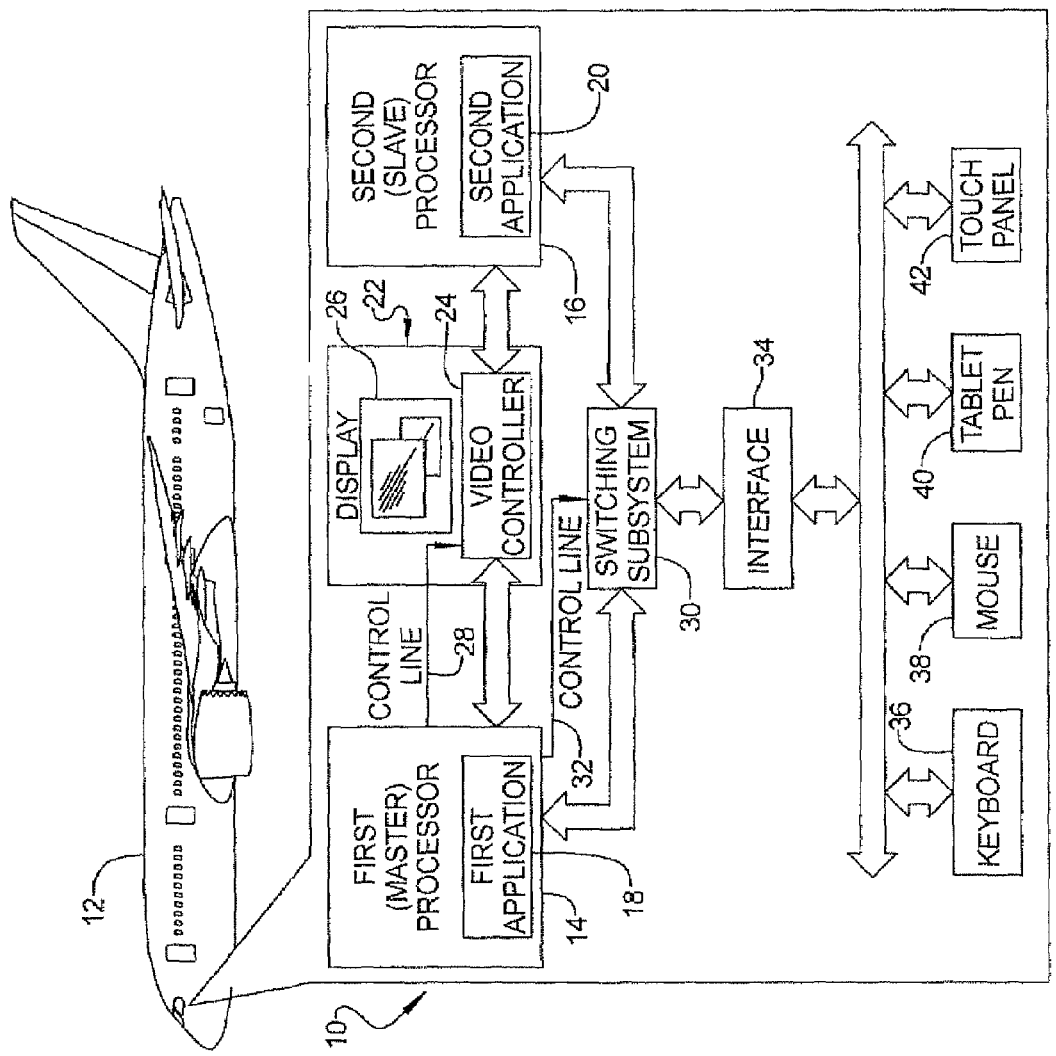
FIG. 1 is a block diagram of one embodiment of a system in accordance with the present disclosure.

Referring to FIG. 1, there is shown a system 10 for forming an information management system for use on a mobile platform. In this example, the mobile platform is illustrated as a commercial aircraft 12. It will be appreciated, however, that the system 10 is particularly well suited for use with both military and commercial aircraft, as well as other various forms of mobile platforms, Merely by way of example, the present system could be implemented on rotorcraft, on marine vessels, or possibility on land vehicles such as buses, trains, etc. The system 10, however, will have particular utility in commercial and military aircraft applications where rigorous certification by the Federal Aviation Administration (FAA) is needed for various types of software applications that are being used in connection with operation of the aircraft.

In one implementation, the system 10 forms a combined Class II and Class III electronic flight bag (EFB) system. Merely for convenience, the system will hereafter be referred to as the "EFB system 10".

In one implementation, the EFB system 10 includes a first or "master" processor 14 and a second "slave" processor 16. The first processor 14 may be used to run a first software application 18 that may be, for example, a Type C software application as defined by the FAA. The second processor 16 may be used to run a second software application 20 that may represent a Type B software application as defined by the FAA. The processors 14 and 16 share a common display system 22 having a display 26 and a video controller 24. Each of the processors 14 and 16 are in bi-directional communication with the video controller 24 such that each can supply information for display on the display screen 26 of the display 22. The first processor 14, however, has control via a control line or bus 28 of the video controller 24 so that is able to interrupt the display of information being provided by the second processor 16 to the display 26 when needed. Such a condition may develop when a need to display more critical flight or aircraft related information arises while the display 26 is being used to display less critical information being supplied by the second application 20 running on the second processor 16.

With further reference to FIG. 1, a switching subsystem 30 is provided that is also controlled by the first processor 14 via a control line or bus 32. An interface 34 enables uni-directional or bi-directional communication between a plurality of input/out (I/O) devices 36, 38, 40 and 42 so that commands for more information can be input by a crew member for use by the system 10. The switching system 30 may be comprised of an electromechanical switch, a purely electronic switch or even a switch implemented by software. Providing control over the switching subsystem 30 to the first processor 14 enables the first processor to take over the switching subsystem 30 in order to generate messages on the display 26 that require an operator acknowledgement or response, in the event of an urgent or important event. This ability enables the EFB system 10 to meet necessary safety standards in accordance with AC 120-76a.

Thus, a principal advantage of the EFB system 10 is that the master processor 14 has control over the video controller 28 and the switching subsystem 30 to thus control access to the display system 22 and/or exactly how information is to be displayed on the display 26. Frequently, first and second processors 14 and 16, respectively, may be operating concurrently performing different tasks. Typically the first processor 14 and its associated first application 18 will be performing or monitoring more critical flight related operations and/or tasks, but may not need use of the display 26 in order to carry out its operations and/or tasks. Frequently, the second processor 16 may be performing less critical operations or tasks that may involve the display of information on the display 26 of the display system 22 for use by a pilot or co-pilot. Thus, it is advantageous that the second processor 16 is afforded use of the display 26 when the display is not required by the first processor 16. However, a situation may develop where the first processor 14 requires immediate use of the display system 22 so that important, flight critical information may be immediately displayed on the display 26 of the display system 22. In this event, the master processor 14 is able to send a signal via the control line 28 to the video controller 24 that modifies the display 26 as needed so that the critical information being generated by the master processor 14 can be displayed on the display 26. In one instance, the master processor 14 may send a command via the control line 28 to the video controller 24 that completely interrupts the flow of the information from the second processor 16 to the display 26 of the display system 22. In another example, the first processor 14 may provide a control signal or command via the control line 28 to the video controller 24 that enables the information being transmitted from the first processor 14 to be displayed on a substantial portion of the display 26, while the information being provided from the second processor 16 is presented in a smaller, background presentation that is partially or substantially covered by the information from the first processor 14. This condition may be similar to a "picture-in-picture" configuration that is commonly used in present day television systems. Alternatively, information from both applications may be presented on the display 26 with the information from the first application 18 overlayed on the information relating to the second application 20. Several logic schemes, for example "AND", "OR", exclusive OR (XOR), non-exclusive OR (NOR), etc., could be employed by the first processor 14 and/or the first application 18 to help make the decision as to exactly how to display information from the two applications 18 and 20 under specific situations or conditions.

Under certain circumstances, it may become necessary for the first processor 14 to completely interrupt the flow of information or data to and from the second processor 16. In this event, the first processor 14 sends a signal via control line or bus 32 to the switching subsystem 34 to temporarily suspend communication between the second processor 16 and the interface 34, and to buffer the information being generated by the first processor 14 in a buffer of the display system 22, Thus, all information and/or commands coming from the I/O devices 36-42 will be routed only to the first processor 14. The first processor 14 and first application 18 will have sole use of the I/O bus so that the pilot or co-pilot may be required to respond to a warning or message presented on the display 26 before further use of the I/O bus can be made by the second processor 16.

The EFB system 10 provides a significant advantage in that since the first processor 14 has complete control over the display system 22, as well as the switching subsystem 30, this eliminates the need for costly certification of the second application to meet rigorous FAA standards governing the use of Type B software applications in commercial aircraft. Thus, the second application 20 may represent a commercial, off-the-shelf software application. Even if the second application 20 is provided as a customized software application, there is still a significant advantage since the costly and rigorous certification required for Type C applications is eliminated. This is because the first processor 14 is provided with the capability of completely wresting control of the display system 22 and the switching subsystem 30 as may be needed to display critical information, or to require an immediate operator response.

As one specific example, consider that the aircraft 10 is at an airport and has left the gate to taxi out to a runway. While the taxiing operation is being performed, one of the crew members may be using the EFB system 10 to view charts or maps or other information that is being provided by the second application 20 and being displayed on the display 26 of the display system 22. If an event should arise that requires immediate attention of the crew members, for example, if the pilot is about to enter the wrong runway, the first processor 14 may immediately interrupt the display of information provided by the second processor 16 so that suitable warning information can be provided on the display 26. In addition, the display 26 could be used to notify the pilot or co-pilot that an immediate response is required before the warning message is removed and use of the display 26 by the second processor 16 is allowed to resume. Accordingly, the crew members would be immediately apprised of a more critical flight related condition or incident that requires immediate attention.

From the foregoing, it should also be appreciated that the EFB system 10 is not limited to the use of only two independent processors. Three or more independent processors could just as readily be implemented provided a suitable priority or hierarchy scheme is employed to manage use of the single display system 22.

Figure 2:
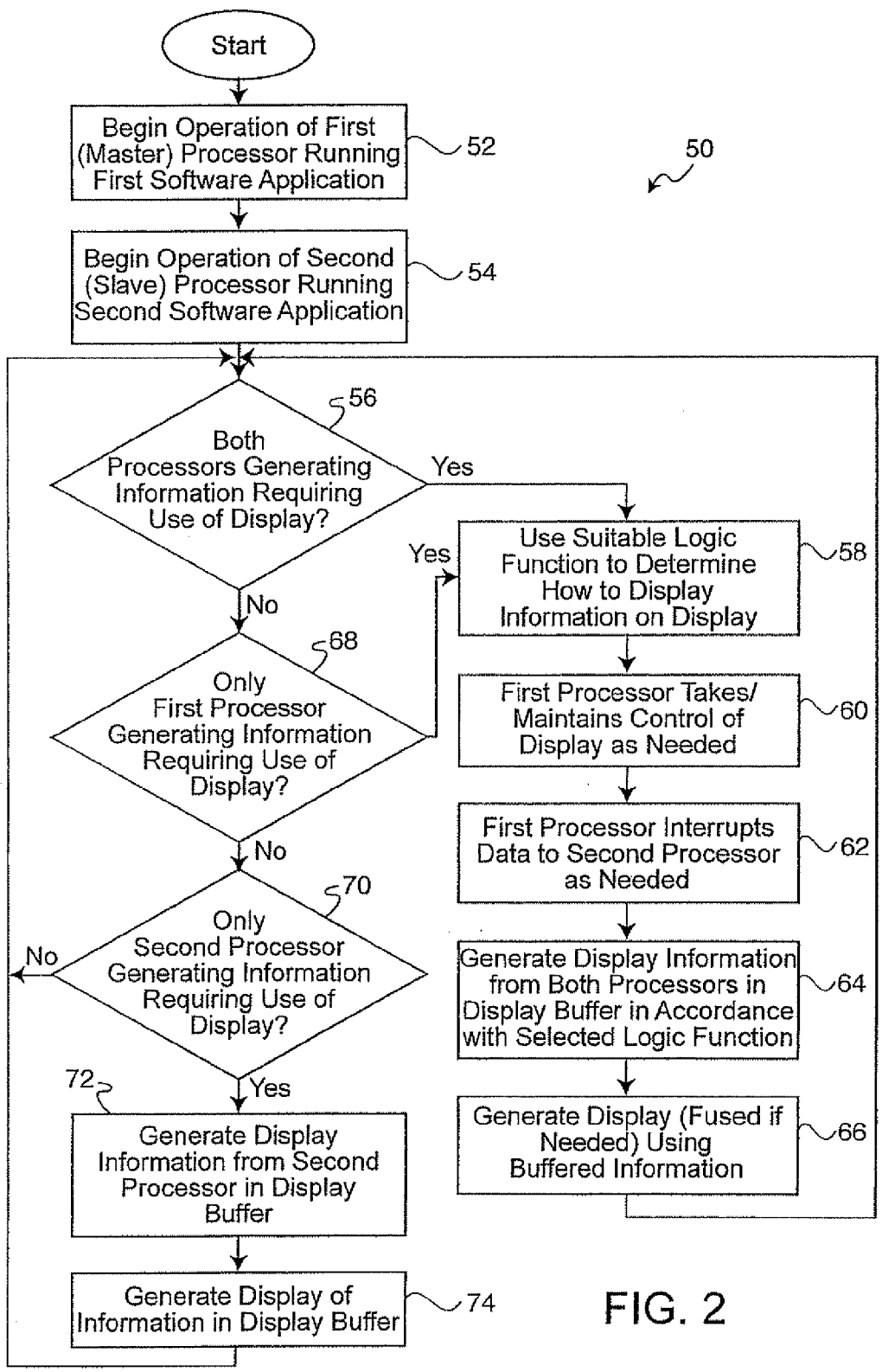
FIG. 2 is a flowchart of exemplary operations that may be performed in accordance with one implementation of a method of the present disclosure.

Referring now to FIG. 2, a flowchart 50 illustrating a plurality of exemplary operations performed by one implementation of the EFB system 10 is shown. In operation 52, the operation of the first processor 14 running the first software application 18 is started. In operation 54, the second processor 16 is started running the second software application 20. In operation 56, a check is made to determine if the applications 18,20 of both processors 14 and 16 are generating information that requires use of the display 26. If so, then at operation 58 the first processor 14 uses one or more suitable logic functions (e.g., AND, NAND, OR, NOR, XOR, etc.) to determine exactly how the more critical information should be displayed on the display 26. This operation may involve displaying the information from the first application 18 in full using the full area of the display 26, or by overlaying of the information from the first application 18 over information from the second application 20, or by creating a picture-in-picture display of the information from both applications 18,20, or by creating a composite or "fused" display using the information from both processors applications 18,20.

At operation 60 the first processor 14 takes control of the display 26 as needed to present the more critical information in the desired manner on the display 26. At operation 62, the first processor 14 interrupts the flow of data to the second processor 16 via the switching subsystem 30, if needed. At operation 64, the information being generated by the first and second applications 18,20 is buffered for display in a display buffer of the display system 22 in accordance with the desired logic function. This operation may involve generating a composite or "fused" representation of the information, if such a form of display is dictated by the logic function. At operation 66, the buffered information is displayed on the display 26 in the specific format or presentation determined by the logic function being used. Thus, the buffered information may be used to form a composite display made up of information from both applications 18,20, or it may involve presenting the buffered information in a picture-in-picture format, or as a portion of information being overlayed on a different portion of information, or even possibly suppressing entirely the information generated by the second application 20.

If the inquiry at operation 56 produced a "No" answer, then at operation 68 an inquiry is made to determine if only the first processor 14 is generating information that requires use of the display 26. If so, then a jump is made to operation 58, and operations 58-66 are performed. If the answer at operation 68 is "No", then a determination is made at operation 70 if only the second processor 16 is generating information that needs to be displayed on the display 26. If the answer to this inquiry is "No", then a jump is made to operation 56, and operation 56 is repeated. If the answer at operation 70 is "Yes", then display information from the second processor 16 is buffered in the display system 22 buffer, as indicated at operation 72. At operation 74, the buffered information is displayed on the display 26.

Operation 56 may be repeated in accordance with a desired interval, for example, every 16.66-40 milliseconds. The operations set forth in the flowchart 50 are merely exemplary and could also be readily modified to include one or more additional operations that monitor for particular internal/external events that would trigger the EFB system 10 to take immediate control of the display system 22 and/or the I/O bus.

Also, the EFB system 10 could be configured to allow a default condition where only one processor is installed and operating on the I/O bus via interface 34, and has use of the display 26. Such an embodiment might be used where a particular aircraft does not require the use of the FAA certified software application, so only one processor would be needed to run a COTS (i.e., un-certified) software application. However, the system 10 will allow an additional processor and corresponding FAA certified software application to be installed when the need arises.

The EFB system 10 thus forms a system that allows two processors operating independently to share the same display and I/O port or bus, but enables the first processor 14 to take control of these components as may be needed to display higher priority flight or aircraft related information when the need arises. This enables commercial, off-the-shelf software to be used with the second processor 16 that reduces or eliminates the need for more rigorous FAA certification. The EFB system 10 also represents a highly cost effective solution because of its ability to share a single display unit and to present information from both applications 18 and 20 in various formats to optimize use of the display 26.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for controlling the display of information to a user, comprising:
    a mobile platform;
    a common display system disposed on the mobile platform, the common display system having a single display screen;
    a first processor operating a first application, and being in communication with said common display system for generating first information to be displayed on said display screen of said common display system;
    a second processor operating a second application, and in communication with said common display system for generating second information, different from said first information, to be displayed on said display screen of said common display system;
    the common display system being shared by the first and second processors;
    the common display system including a common video controller having an output in communication with the display screen, and inputs in communication with both the first processor and the second processor;
    said first processor further adapted to take control of said display screen, without a prior user command and while both of said processors remain operating and running their respective said applications without any malfunction, to override said second information being displayed on said common display system by said second processor, so that the presentation of said second information on said display screen is able to be at least one of modified and suppressed, depending on operation of said first application.

2. The system of claim 1, wherein said first processor uses one or more logic functions to determine a specific format that information from said second application should be presented in on said display screen.

3. The system of claim 1, wherein said first processor controls said display screen so that said first information generated by said first application has priority over said second information generated by said second application, and such that said second information is prevented from being displayed on said display screen while said first information is being displayed.

4. The system of claim 1, wherein said first processor controls said display screen so that said first information generated by said first application has priority over said second information generated by said second application, and such that said first information is presented over and at least partially occludes said second information on said display screen.

5. The system of claim 1, further comprising a switching subsystem controlled by said first processor for interrupting a flow of information to said second processor depending on operation of said first application.

6. The system of claim 5, wherein said switching subsystem comprises an electro-mechanical switch.

7. The system of claim 5, wherein said switching subsystem comprises an electrical switch.

8. The system of claim 5, wherein said switching comprises a software switch controlled by said first processor.

9. The system of claim 1, wherein said first processor controls said common video controller to command said common video controller to present said first information and said second information to one of the following formats:
    said second information is prevented from being displayed on said display screen, while said first information is displayed on said display screen; and
    said first information is overlaid onto said second information, to partially occlude said second information.

10. The system of claim 1, wherein said first application comprises a software application certified by a governmental agency for operation in an aircraft.

11. The system of claim 1, wherein said second application comprises a commercially available software program requiring no government certification for use on an aircraft.

12. An electronic flight bag system for use on an aircraft for controlling the display of information to a user, comprising:
- a common display system having a single display screen;
- a first processor operating a first application, and being in communication with said common display system for generating first information to be displayed on said single display screen, said first application representing an application certified by a governmental regulating agency for use on an aircraft;
- a second processor operating a second application, and in communication with said common display system for generating second information, different from said first information, to be displayed on said single display screen, said second application representing an application that requires no prior governmental regulating agency certification for use on an aircraft;
- said first processor further adapted to take control of said common display system, without a user command, to control said common display system so that the presentation of said second information on said single display screen is able to be at least one of:
  - completely eliminated, depending upon operation of said first application; and
  - partially blocked by presenting said first information over a substantial portion of said single display screen, depending upon operation of said first application.

13. The system of claim 12, further comprising a video controller controlled by said first processor, and in communication with both of said processors, for controlling the displaying of information on said single display screen.

14. The system of claim 12, wherein said first application comprises a software application requiring certification by a governmental regulating agency for approval for use on an aircraft.

15. The system of claim 12, wherein said second application comprises a software application that does not require prior certification by a governmental regulating agency for use on an aircraft.

16. A method for controlling the display of information to a user, comprising:
- on a mobile platform, providing a common display system accessible and controllable by two independent processors, the common display system having a single display screen;
- using a first processor to operate a first application that performs a first task having a first level of priority, and that controls a display of first information on the single display screen relating to said first task;
- using a second processor to operate a second application that performs a second task having a second level of priority, the second application operating to control a display of second information, different from said first information, relating to said second task on said single display screen; and
- further controlling said single display screen to override a presentation of said second information on said single display screen, without a prior user command and while both of said processors remain operating and running their respective said applications without any malfunction, while permitting a presentation of said first information on said single display screen, in response to operation of said first application.

17. The method of claim 16, wherein said controlling the single display screen to override a presentation of said second information comprises further comprising using said first processor to controllably interrupt a flow of data from an external source to said second processor, in accordance with operation of said first application.

18. The method of claim 16, wherein:
- said using a first processor to operate a first application comprises using a first processor to operate a first application that requires certification from a governmental regulating body for use on said mobile platform; and
- said using a second processor to operate a second application comprises using the second processor to operate a second application that does not require certification by a governmental regulating body for use on said mobile platform.

19. A system for controlling the display of information on a mobile platform to a user, comprising:
- a common display system having a single display screen;
- first processor operating a first application, and being in communication with said common display system for generating first information to be displayed on said display screen of said common display system;
- a second processor operating a second application, and in communication with said common display system for generating second information, different from said first information, to be displayed on said display screen of said common display system;
- the common display system being shared by the first and second processors;
  - the common display system including a common video controller having an output in communication with the display screen, and inputs in communication with both the first processor and the second processor;
  - said first processor further adapted to take control of said display screen, without a prior user command and while both of said processors remain operating and running their respective said applications without any malfunction, to override said second information being displayed on said common display system by said second processor, so that the presentation of said second information on said display screen is able to be at least one of modified and suppressed, depending on operation of said first application; and
- wherein said first processor uses one or more logic functions to determine a specific format that information from said second application should be presented in on said display screen.

* * * * *